US008125686B2

(12) United States Patent
Akado et al.

(10) Patent No.: US 8,125,686 B2
(45) Date of Patent: Feb. 28, 2012

(54) ADJUSTMENT OF PRINTER SETTINGS

(75) Inventors: Yukinobu Akado, Kawasaki (JP); Takahiro Suzuki, Tokyo (JP); Hisato Sekine, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 12/254,837

(22) Filed: Oct. 21, 2008

(65) Prior Publication Data

US 2009/0051968 A1 Feb. 26, 2009

Related U.S. Application Data

(63) Continuation of application No. PCT/JP2008/058587, filed on Apr. 30, 2008.

(30) Foreign Application Priority Data

May 1, 2007 (JP) .................................. 2007-121310

(51) Int. Cl.
 *H04N 1/46* (2006.01)
(52) U.S. Cl. ........ 358/1.9; 358/504; 358/531; 358/1.15; 347/19
(58) Field of Classification Search .................. 358/504, 358/1.9, 531; 347/19
 See application file for complete search history.

(56) References Cited

U.S. PATENT DOCUMENTS

| | | | |
|---|---|---|---|
| 6,607,261 B1 * | 8/2003 | Shimada .......................... | 347/19 |
| 7,148,978 B1 | 12/2006 | Mori | |
| 7,149,444 B2 * | 12/2006 | Tanaka et al. .................... | 399/49 |
| 7,198,347 B2 * | 4/2007 | Tayuki ............................ | 347/19 |
| 7,310,156 B2 | 12/2007 | Watanabe et al. | |
| 7,428,072 B2 | 9/2008 | Suzuki | |
| 7,463,386 B2 * | 12/2008 | Misumi ........................... | 358/1.9 |
| 7,724,384 B2 * | 5/2010 | Hwang et al. .................. | 358/1.13 |
| 2003/0223795 A1 | 12/2003 | Gomi | |
| 2004/0114157 A1 * | 6/2004 | Linder et al. .................... | 358/1.9 |
| 2004/0227964 A1 * | 11/2004 | Fujino ............................ | 358/1.9 |
| 2006/0170939 A1 | 8/2006 | Mizue | |

(Continued)

FOREIGN PATENT DOCUMENTS

EP 1 048 472 11/2000

(Continued)

OTHER PUBLICATIONS

Chinese Office Action relating to Chinese Application No. 200880012120.6, filed Jan. 31, 2011.

(Continued)

*Primary Examiner* — Twyler Haskins
*Assistant Examiner* — Dennis Dicker
(74) *Attorney, Agent, or Firm* — Fitzpatrick, Cella, Harper & Scinto (57) ABSTRACT

When a subsidiary printout is printed from a printer driver, it is an object to enable a subsidiary print job to be formed without destroying a relationship between the master and the servant in a print process. A first print job formed by a first application program is input through an operating system and a printer driver processes the input first print job. A second application program which forms a second print job different from the first print job and sends to the operating system is provided. The printer driver starts the second application program, transfers settings of the printer driver to the second application program, receives the second print job formed by the second application program through the operating system, processes the second print job, and allows a printer to print the second print job.

9 Claims, 11 Drawing Sheets

U.S. PATENT DOCUMENTS

2007/0146776 A1 6/2007 Suzuki
2008/0094650 A1 4/2008 Suzuki

FOREIGN PATENT DOCUMENTS

| JP | 2000025311 A | 1/2000 |
| JP | 2002-132472 | 5/2002 |
| JP | 2003-263288 | 9/2003 |
| JP | 2004-054895 | 2/2004 |
| JP | 2004-164125 | 6/2004 |
| JP | 2007038578 A | 2/2007 |
| JP | 2007074531 A | 3/2007 |
| WO | 0030857 A | 6/2000 |

OTHER PUBLICATIONS

European Search report dated Jun. 8, 2010 corresponding to Application No. 08752473.2-1245.

* cited by examiner

ADJUSTMENT OF PRINTER SETTINGS

CROSS REFERENCE TO RELATED APPLICATIONS

This application is a continuation of International Application No. PCT/JP2008/058587, filed Apr. 30, 2008, which claims the benefit of Japanese Patent Application No. 2007-121310, filed May 1, 2007.

BACKGROUND OF THE INVENTION

1. Field of the Invention

The invention relates to a print control system constructed by a printer driver which operates depending on an application program and an operating system, a control method of the print control system, and a control program of an information processing apparatus. More particularly, the invention relates to creation of a second print job different from a first print job designated from an application program.

2. Description of the Related Arts

Hitherto, in the case of printing on a computer in which an operating system such as Microsoft (registered trademark) Windows (registered trademark) or the like has been installed, an application program forms a print job. The print job is sent to a printer driver through a process of the operating system. The printer driver executes printing in such order that the print job is converted into a format such as a PDL or the like which can be processed by a printer and transmitted to the printer (for example, refer to Japanese Patent Application Laid-Open Nos. 2003-263288 and 2004-54895).

Figure 8:
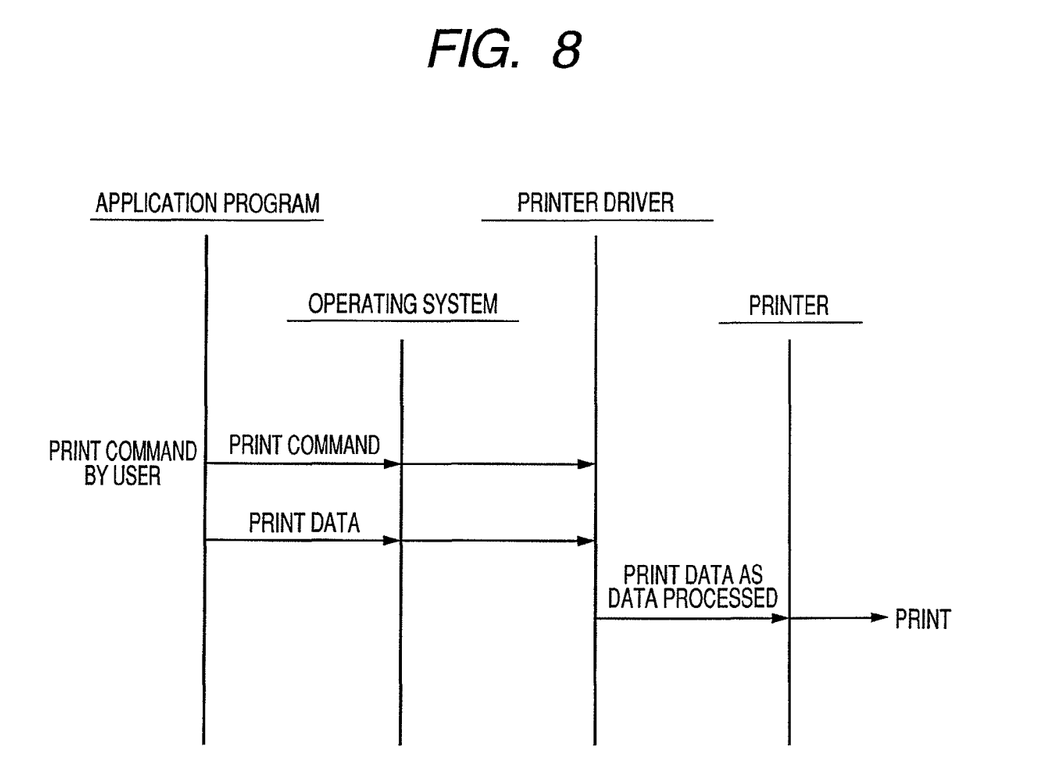
FIG. 8 is a timing chart illustrating the operation in a first related art.

FIG. 8 is a timing chart illustrating the operation of a first related art.

Figure 9:
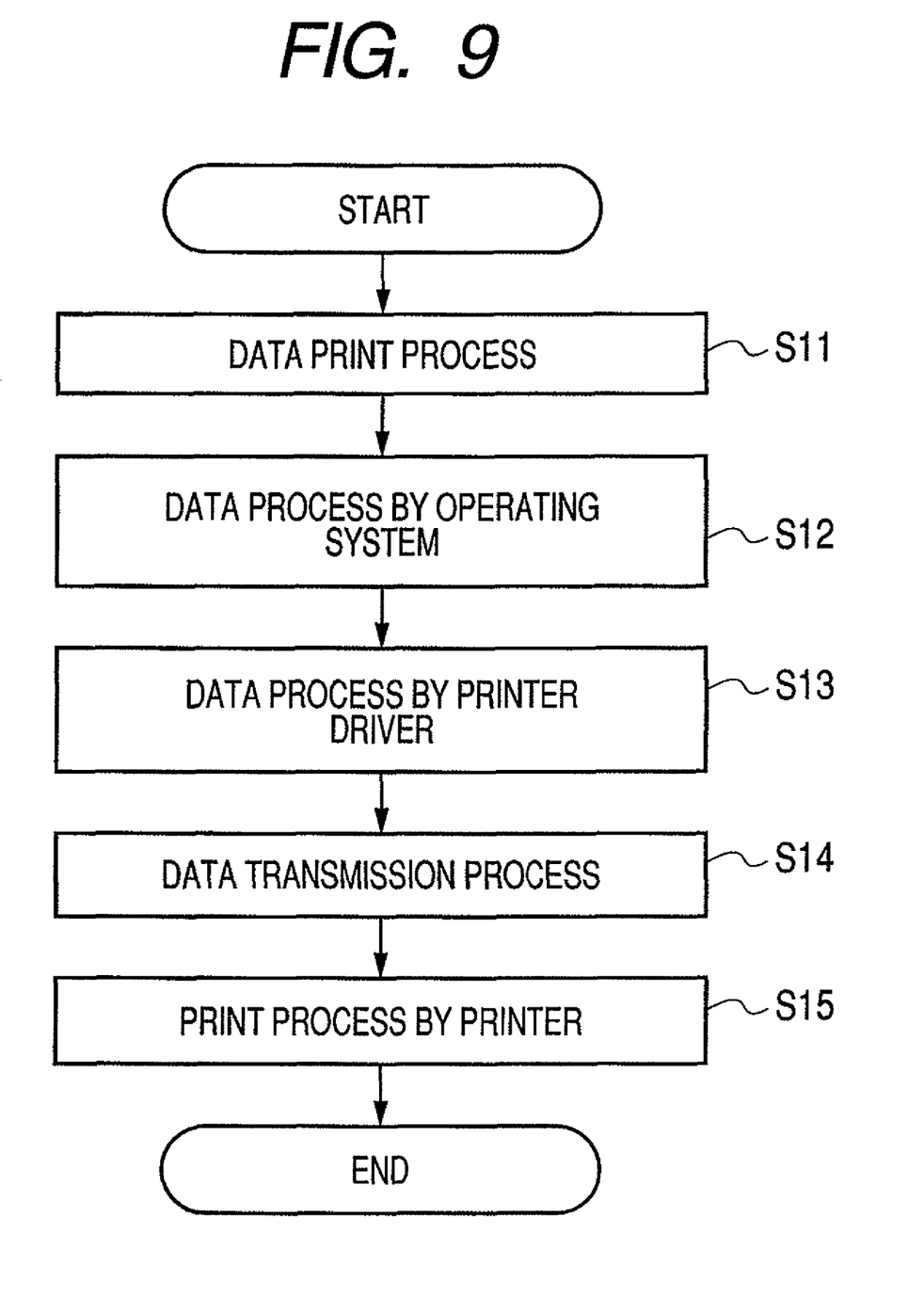
FIG. 9 is a flowchart illustrating the operation in the first related art.

FIG. 9 is a flowchart illustrating the operation of the first related art.

In the above first related art, the application program is an application program having a printing function such as Microsoft (registered trademark) Word or the like. In S11, when the user instructs printing, the print job is formed. The formed print job is constructed by a print command and print data. In S12, each of them is subjected to a data process by the operating system and transferred to the printer driver. The printer driver converts the print data into a format which can be printed by the printer in S13 and transmits it to the printer in S14. The printer prints it in S15. In the above first related art, the general printing operation from the application program is executed.

Figure 10:
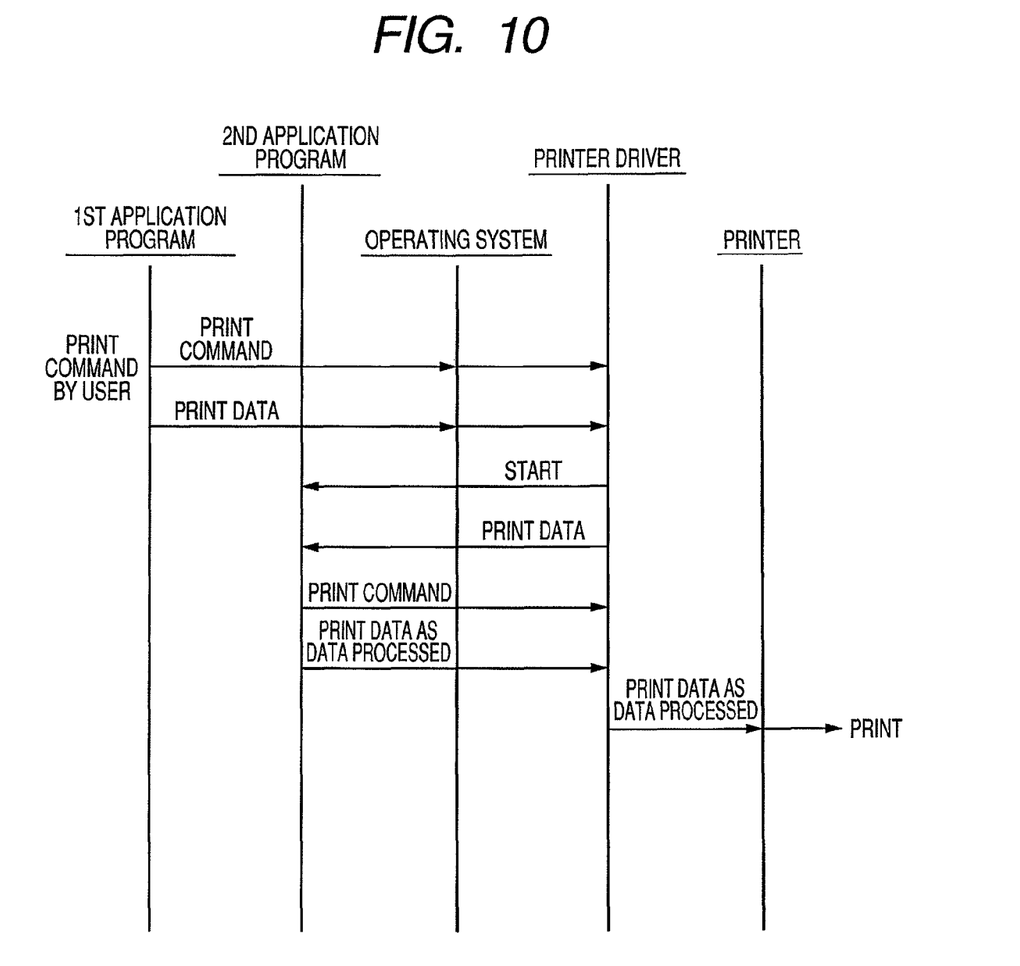
FIG. 10 is a timing chart illustrating the operation in a second related art.

FIG. 10 is a timing chart illustrating the operation of a second related art.

Figure 11:
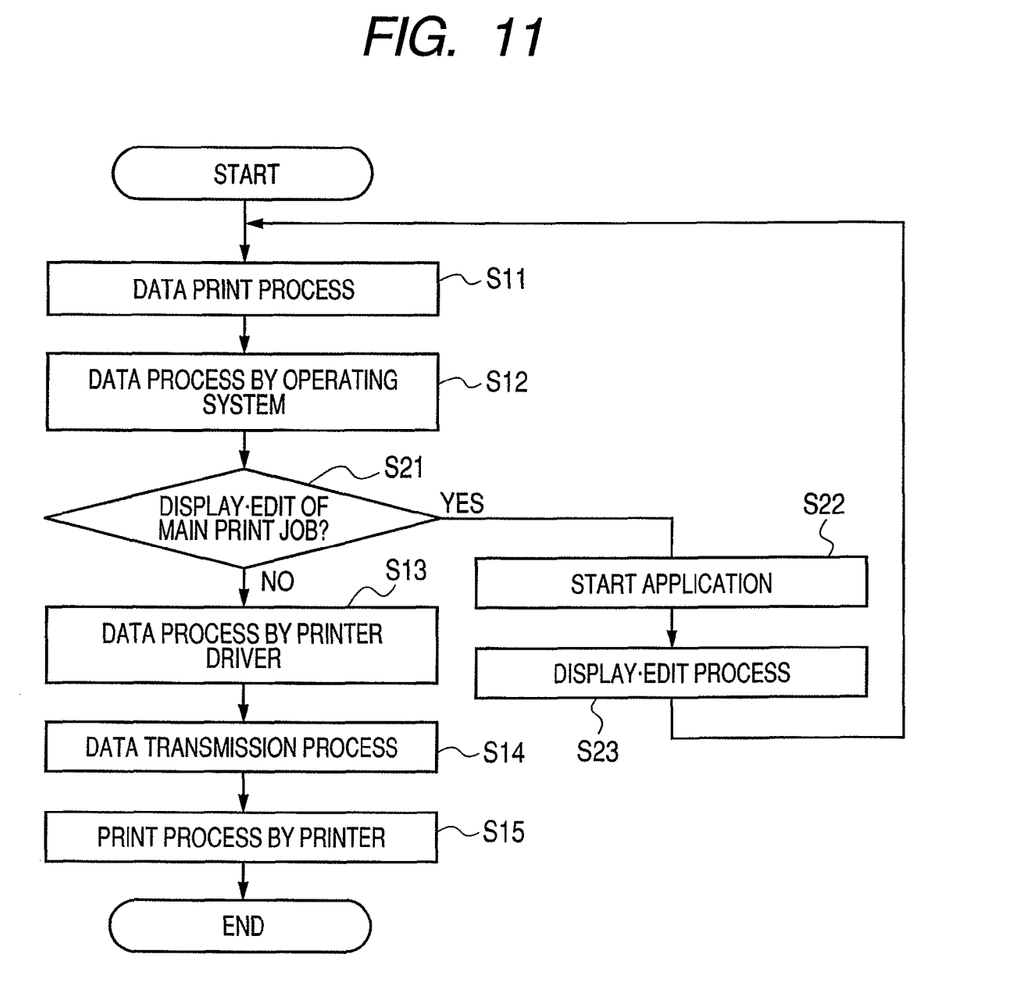
FIG. 11 is a flowchart illustrating the operation in the second related art.

FIG. 11 is a flowchart illustrating the operation of the second related art.

In FIG. 10, a first application program is similar to the application program in the first related art. With respect to portions overlapped with those in the first related art, their description is omitted. The operating system transfers the print command and print data constructing the main print job formed by the first application program to the printer driver. In the second related art, whether or not a display-edit of the main print job is executed according to settings on the printer driver is discriminated in S21.

Specifically speaking, the above "display-edit of the print job" is such a function that the job in which the printing has been instructed by the user is confirmed by a print preview function or such a function that information about a stamp, a header, and a footer is added to the formed print data.

In the case of executing the display-edit in S23, the second application program illustrated in FIG. 10 is started from the printer driver in S22. According to the second application program, after a preview display and an editing process were executed, a data print process is executed again by a user instruction, and thereafter, the print process is executed in a manner similar to the first related art.

In the case of the second related art, according to the second application program, a whole page is displayed, print order is changed on a page unit basis, or a plurality of pages are recorded onto one sheet of recording paper, and thus there is no need to change print settings of the driver. Therefore, data which is transferred from the printer driver to the second application program is data of a metafile format which is used when the operating system spools the job. That is, information regarding the settings of the printer is not transferred from the printer driver to the second application program.

However, in the case where a subsidiary printout different from a printed material which the user wants to obtain as a printout, for example, a printed material such as a chart or the like for performing color matching of an inherent printout is printed from the printer driver, there are the following problems.

For example, a case where the printer driver forms the print job and performs printing, in place of an application program of a print system in the related art is now presumed. Normally, the printer driver receives the print job from the operating system and processes the received print job. However, since in the above presumption the printer driver forms the print job, a relationship between the master and the servant in the print process is broken.

In the print process in the general operating system including Microsoft (registered trademark) Windows (registered trademark), a reversal of the above relationship between the master and the servant is not permitted. There is, consequently, such a problem that the printer driver cannot directly form a subsidiary print job.

SUMMARY OF THE INVENTION

It is an object of the invention to provide a print control system in which in a print system on an operating system, in the case of printing a subsidiary printout from a printer driver, a subsidiary print job can be formed without destroying a relationship between the master and the servant in a print process.

DESCRIPTION OF THE EMBODIMENTS

A best mode for carrying out the invention is the following embodiments.

Embodiment 1

Figure 1:
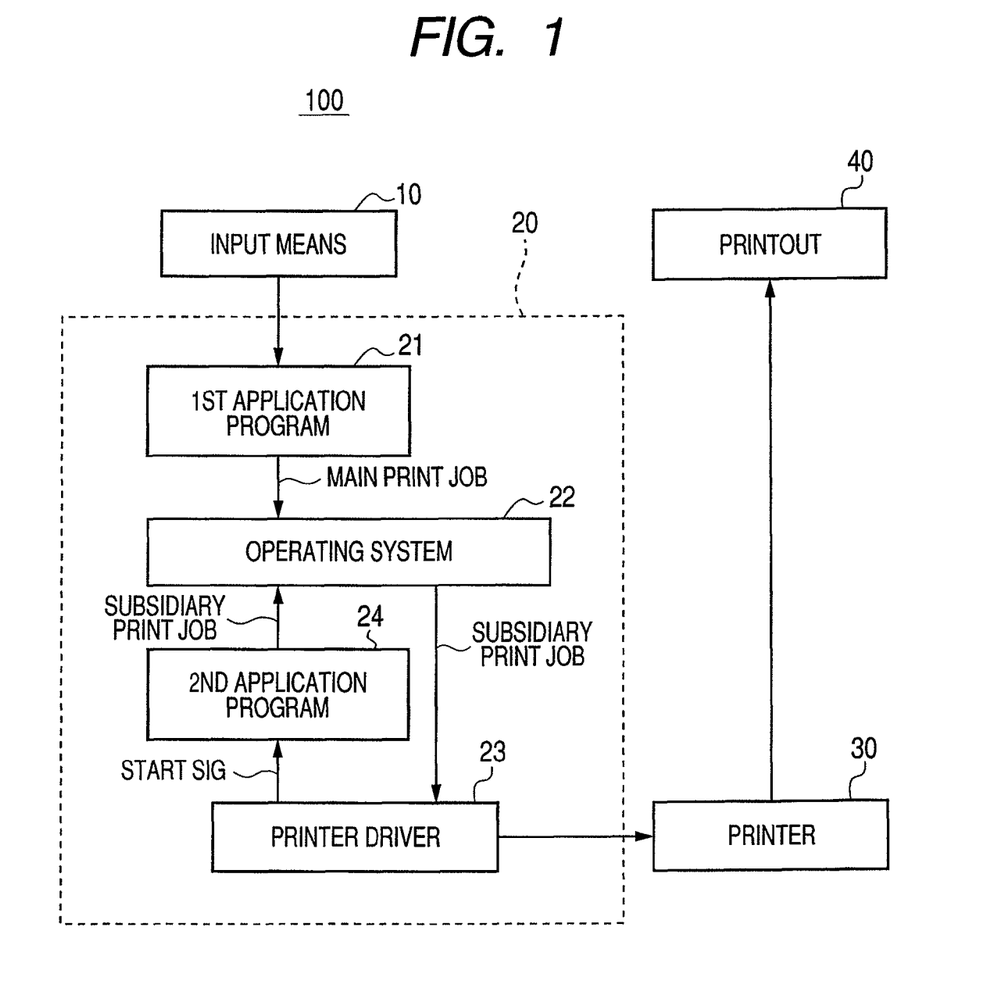
FIG. 1 is a block diagram of a print control system 100 according to an embodiment 1 of the invention.

FIG. 1 is a block diagram of a print control system 100 according to an embodiment 1 of the invention.

The print control system 100 has input means 10, data processing means 20, and a printer 30.

The input means 10 is input means such as mouse, keyboard, or the like.

The data processing means 20 is constructed by a host computer and the like and has a first application program 21, an operating system 22, a printer driver 23, and a second application program 24.

The first application program 21 is an application program having a print function, is an example of first print job forming means, and forms a main print job (first print job). The formed main print job is transmitted to the printer driver 23 through the operating system 22.

The printer driver 23 starts the second application program 24, thereby allowing the second application program 24 to form a subsidiary print job (second print job). The printer 30 is allowed to print the formed subsidiary print job through the operating system 22. That is, the printer driver 23 converts data held in the print job into a format such as a PDL or the like and transmits it to the printer 30.

The second application program 24 forms a subsidiary print job and is an example of second print job forming means.

The printer 30 is an ink jet printer, a laser beam printer, or the like and prints a printout 40 based on the received print job.

As a printing for special application which depends on the printer 30, there is a printing for color adjustment of the printer such as color matching or the like, a patch output for forming an ICC profile, or the like. Unlike a main print job for executing the printing from the application program, those operations are subsidiary print jobs for print setting and the like. It is possible to consider that an object for executing those printings which depend on the printer 30 is a part of the setting which is made until the main print job is formed. It is, therefore, desirable that the printer driver 23 in which other print settings have been summarized executes the printing.

However, the printer driver 23 is a side of receiving the print job from the operating system 22, that is, it is existence which depends on the operating system 22. If the printer driver 23 directly forms the job and directly transmits the formed job to the operating system 22, this means that the relationship between the master and the servant regarding the operating system 22 and the printer driver 23 is reversed. Such a reverse phenomenon is not permitted in the print system of the general operating system represented by Microsoft (registered trademark) Windows (registered trademark). Therefore, the printer driver 23 cannot directly form the job and transmit the formed job to the operating system 22.

In the embodiment 1, therefore, the following construction is used in order to obtain the subsidiary printout by setting the printer driver 23 to a start point. The printer driver 23 starts the second application program 24 for forming a subsidiary print job different from the main print job.

Since the second application program 24 operates as one application program, it transmits the job to the printer driver 23 through the operating system 22 in a manner similar to the first application program 21. After that, in a manner similar to the above, the subsidiary print job processed in the printer driver 23 is printed by the printer 30 and a subsidiary printed material is obtained as a printout 40.

Subsequently, a construction in which the set values obtained from the above subsidiary printed material are reflected to the printing of the main print job will be described. Since the above construction itself is substantially the same as the construction in which the above main print job is formed and printed, its description is omitted.

The second application program 24 forms the main print job. The second application program 24 differs from the first application program 21 with respect to a point that when the main print job is formed, the set values described (input) in the subsidiary printed material by the user are detected and the detected set values are set into the printer driver 23. Thus, the set values obtained by the subsidiary printed material are reflected to the printout 40 printed by the printer 30.

In the embodiment 1, a method whereby in order to perform color matching according to a printed material viewing environment, which will be described hereinafter in FIG. 2 and the like, environment light setting charts are output and the set values written into the environment light setting charts by the user are reflected to the main print job, will be described.

The embodiment 1 can be also applied to the case where the subsidiary printed materials such as patch environment light setting charts or the like for calibration of the printer and creation of the ICC profile are produced to adjust the color of the main print job.

Figure 2:
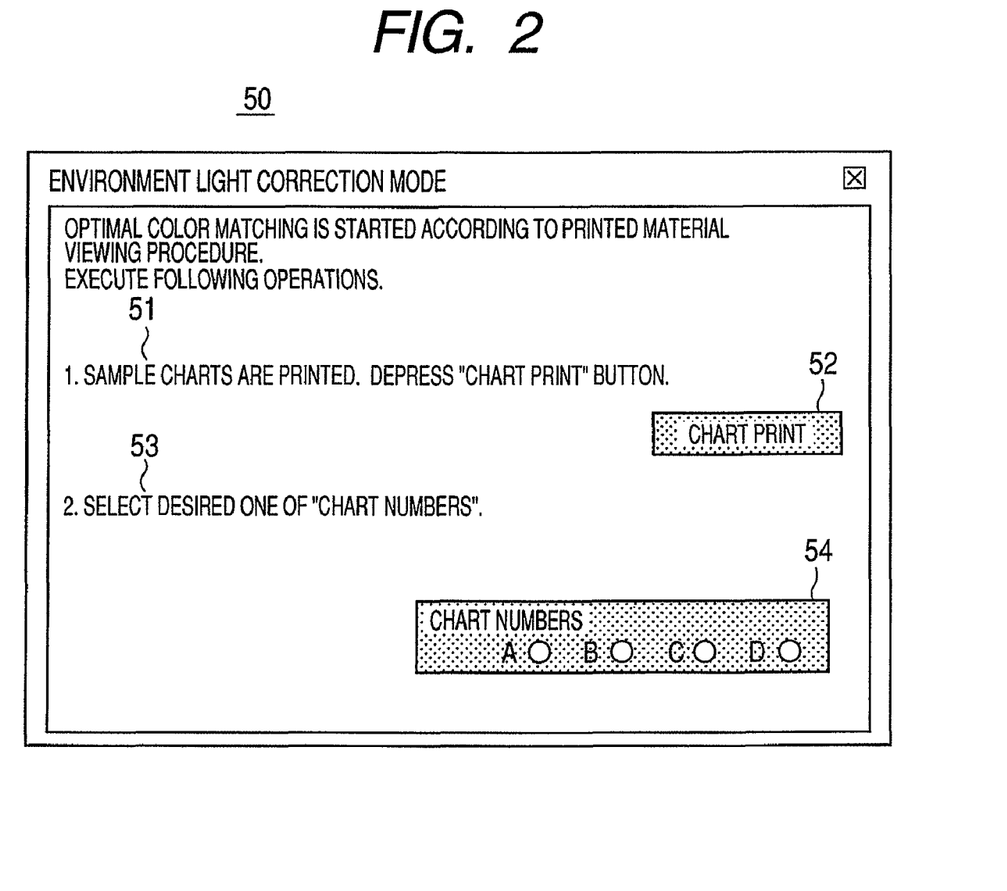
FIG. 2 is a diagram illustrating an example of an environment light correction mode dialog 50 corresponding to a subsidiary print job, wherein a printer driver 23 starts a second application program 24 and outputs the subsidiary print job in the embodiment 1.

FIG. 2 is a diagram illustrating an example of an environment light correction mode dialog 50 corresponding to a subsidiary print job. In this case, the printer driver 23 starts the second application program 24 and outputs the subsidiary print job in the embodiment 1.

The environment light correction mode dialog 50 is a display screen of the printer driver 23 and is a dialog provided on the printer driver 23 in order to properly perform the color matching of the printed material according to environment light (light in an environment where the printed material is viewed). In the environment light correction mode dialog 50, there are displayed: a description sentence 51 of sample environment light setting chart print; an environment light setting chart print button 52; a description 53 of environment light setting chart selection; and a selection radio button 54 of an environment light setting chart number.

By depressing the environment light setting chart print button 52 according to the description sentence 51 of the sample environment light setting chart print, an application display screen (refer to FIG. 3) as a second application program 24 can be started.

The description 53 of the environment light setting chart selection is a description for urging the selection of the environment light setting chart number described in printed environment light setting charts 70. The environment light setting chart number is a set value which is determined by the environment light setting charts 70. This set value is a set value which is reflected when the main print job is printed. That is, by inputting the set value by the selection radio button 54 of the environment light setting chart number according to the description 53 of the environment light setting chart selection, the settings which have previously been allocated to the environment light setting chart number can be reflected when the main print job is printed.

By selecting the selection radio button 54 of the environment light setting chart number, the set value obtained by the second application program 24 are reflected on the printer driver 23. In the case of reflecting the set values, a reflection target is not limited to the printer driver 23, but it is also possible to construct in such a manner that the set value is directly input from the operating unit of the printer 30 and the number which seems to be optimal among results obtained when the environment light setting charts are viewed at the display location is reflected.

Figure 3:
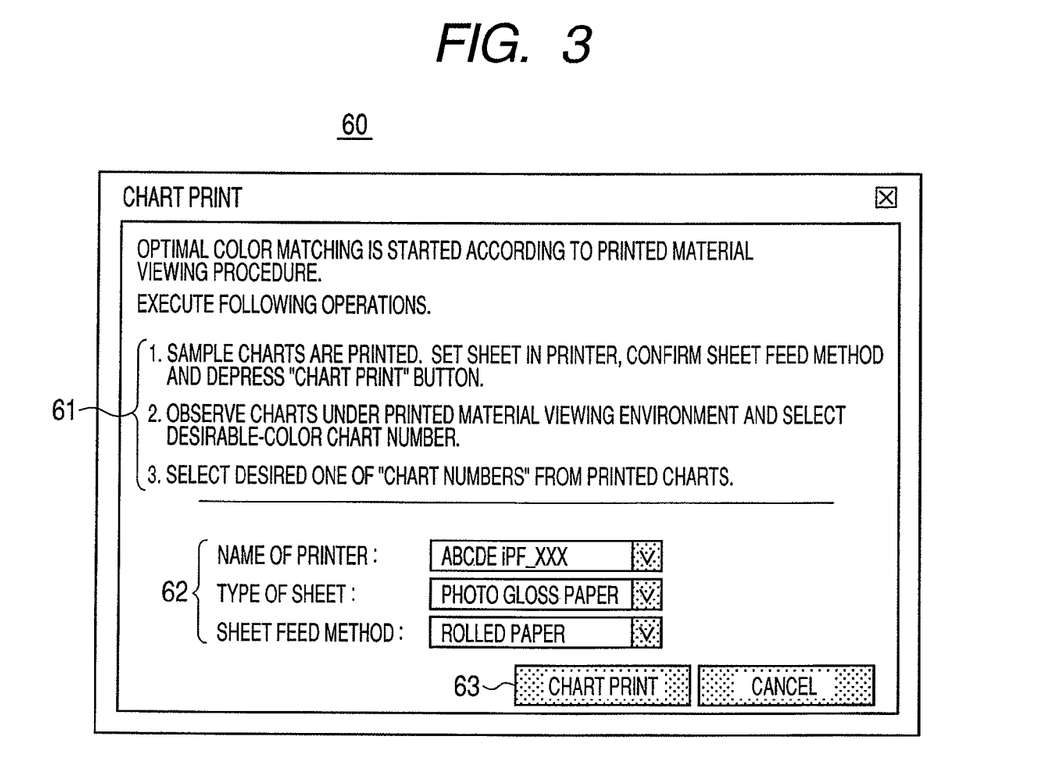
FIG. 3 is a diagram illustrating an example of an application display screen 60 which is held in the second application program 24 and started by clicking an environment light setting chart print button 52 illustrated in FIG. 2.

FIG. 3 is a diagram illustrating an example of an application display screen 60 which is started by clicking the environment light setting chart print button 52 illustrated in FIG. 2, that is, an example of the application display screen 60 held in the second application program 24.

A procedure 61 for making the environment light setting, set items 62 on the application program, and an environment light setting chart print button 63 are displayed on the application display screen 60.

On the application display screen 60, by executing the operation according to the procedure 61 for making the environment light setting, the environment light correction can be made. As for the setting of the set items 62 on the application display screen 60, it is assumed that the set items on the printer driver 23 serving as a starting source are succeeded and thus the same settings have been selected. Therefore, once the items are set by the printer driver 23, it is unnecessary for the user to select the set values again. The environment light setting chart print button 63 is a button for printing the environment light setting charts (refer to FIG. 4) and starting the creation of the subsidiary print job.

Figure 4:
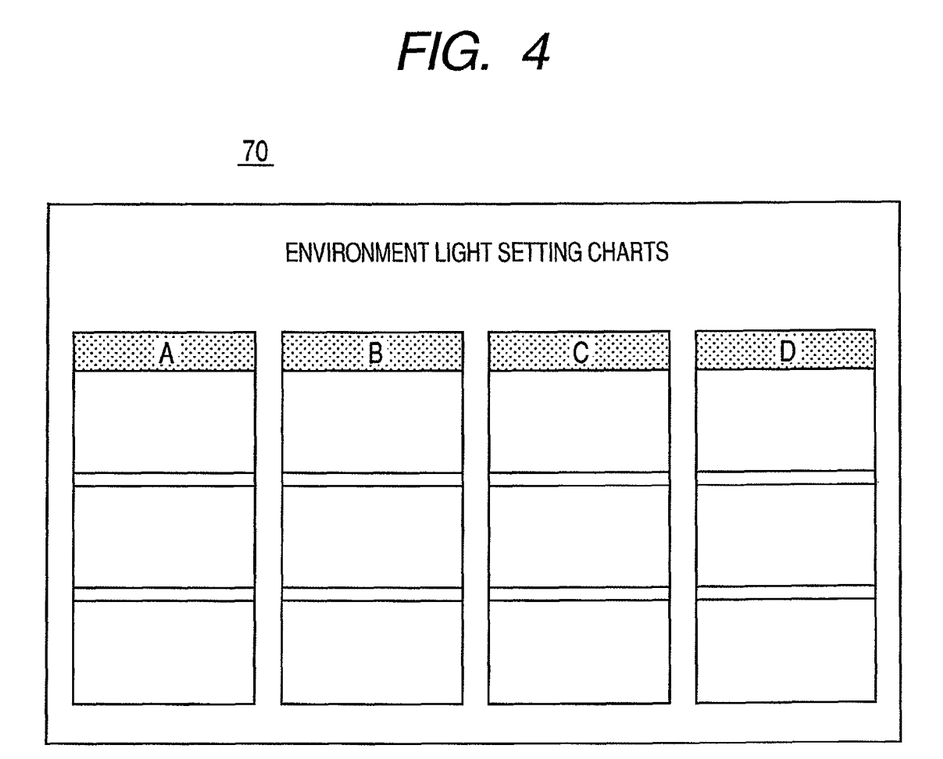
FIG. 4 is a diagram illustrating examples of environment light setting charts 70 as a subsidiary print job instructed through the application display screen 60.

The second application program 24 may print the subsidiary print job (environment light setting charts 70) after the printer driver 23 started the second application program 24 without displaying the application display screen 60. For example, in the ink jet printer, if timing for discharging the ink is deviated, there is a case where an impact position of the ink onto the sheet is deviated and the printing cannot be performed in presumed color. At this time, it is necessary to adjust the ink discharge timing and it is sufficient to directly print an ink discharge timing adjustment environment light setting chart (subsidiary print job) after the printer driver 23 was started without displaying the display screen of the second application program 24.

FIG. 4 is a diagram illustrating examples of the environment light setting charts 70 as a subsidiary print job instructed through the application display screen 60.

In the environment where the printed material is actually viewed, the user confirms the environment light setting charts 70 and selects an integratedly optimal one of selection items A to D.

In the examples illustrated in FIG. 4, the environment light setting charts for presuming the environment where the printed material is actually viewed are output. For example, first, the patch environment light setting chart for performing the calibration of the printer 30 and the patch environment light setting chart for forming the ICC profile are output. After color values of the environment light setting charts were measured by a color value measuring instrument, they may be reflected to the printer driver 23.

Subsequently, a difference between the processes in the embodiment 1 and the processes in the related art will be described.

Figure 5:
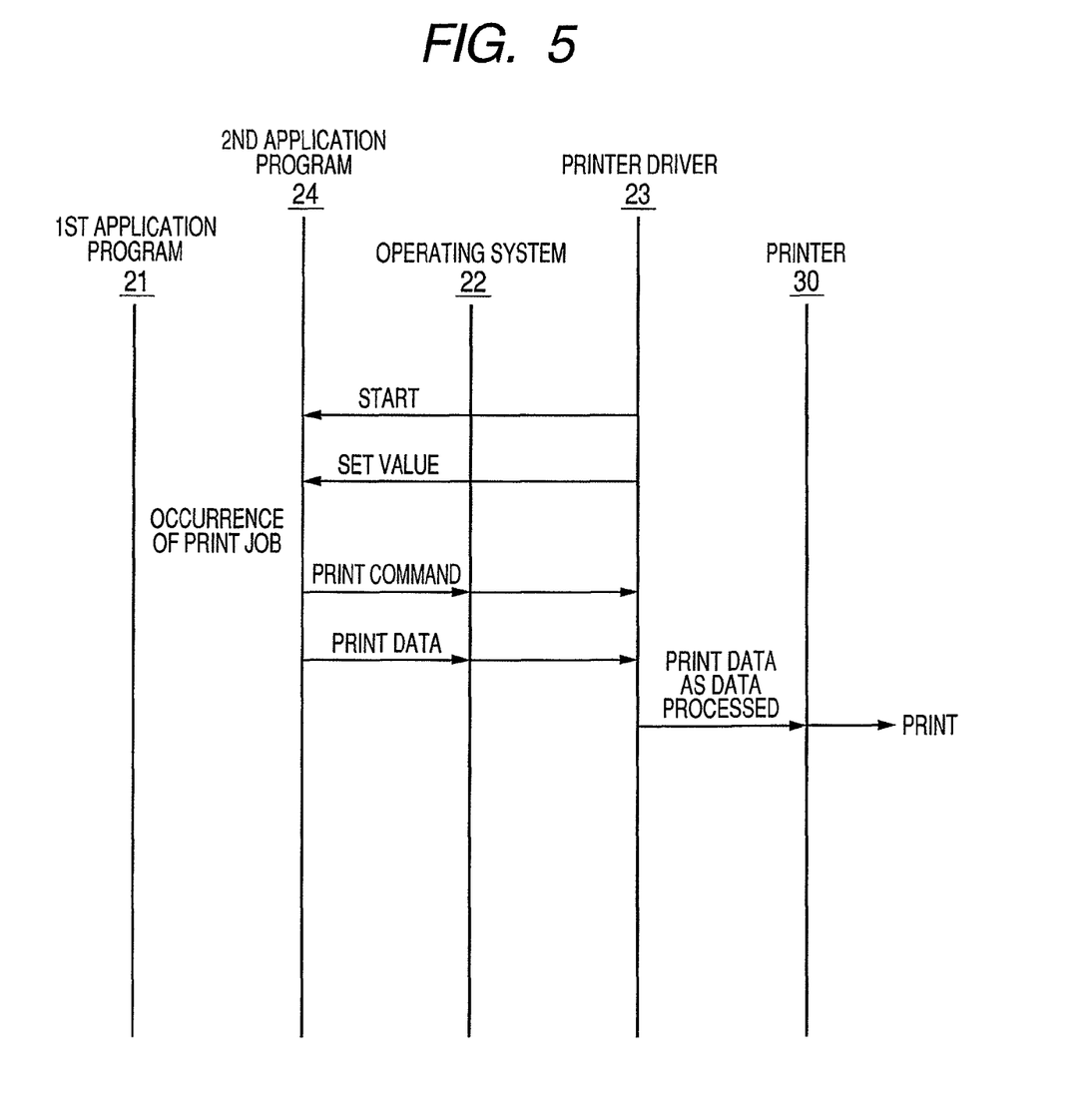
FIG. 5 is a time chart illustrating the operation in the embodiment 1.

FIG. 5 is a time chart illustrating the operation in the embodiment 1.

Figure 6:
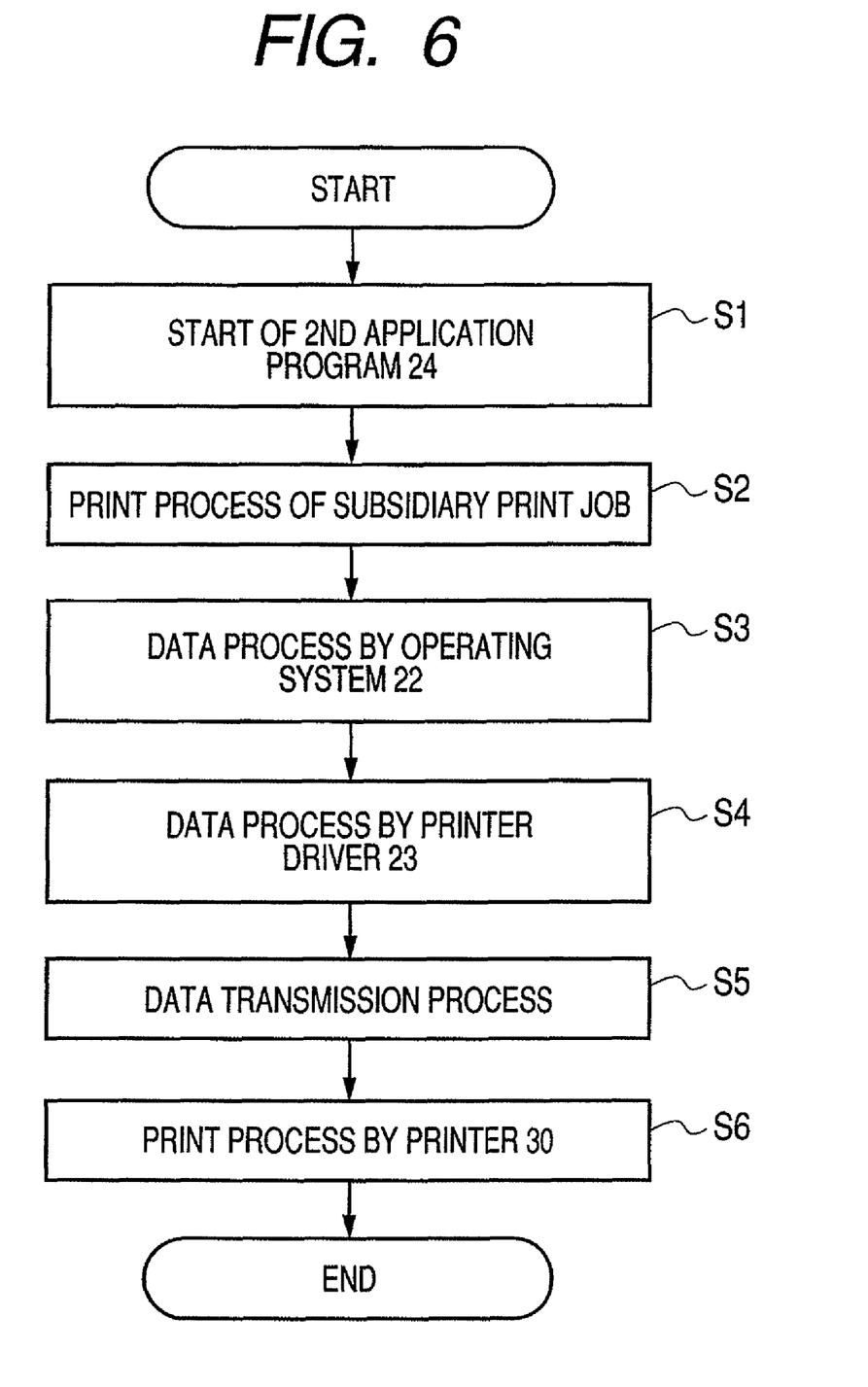
FIG. 6 is a flowchart illustrating the operation in the embodiment 1.

FIG. 6 is a flowchart illustrating the operation in the embodiment 1.

In the embodiment 1, first, the second application program 24 is started from the printer driver 23 (in step S1 of FIG. 6). That is, since the print job cannot be directly issued to the operating system 22, a trigger to start the process is the printer driver 23.

As indicated in FIG. 5 and in step S2 of FIG. 6, when the second application program 24 is started, an arbitrary ones of the set items set in the printer driver 23 can be succeeded to the second application program 24 and started. The second application program 24 is an application program for forming the subsidiary print job. The second application program 24 has a user interface (application display screen 60) and the like illustrated in FIG. 3 and prints the environment light setting charts 70 illustrated in FIG. 4 or the like by the subsidiary job print process.

In the first related art illustrated in FIGS. 8 and 9, the main print job is printed as it is. In the second related art illustrated in FIGS. 10 and 11, although the print job is formed again by the second application program, only the main print job is printed.

In the embodiment 1, the subsidiary print job instead of the main print job is formed and printed by the second application program 24. The embodiment 1 differs from the related arts in terms of this point. In step S3 to S6 of FIG. 6, the print process which is executed after the subsidiary print job was formed by the second application program 24 is similar to that of the processing means of the main print job in the first related art (step S12 to S15 of FIG. 9).

Figure 7:
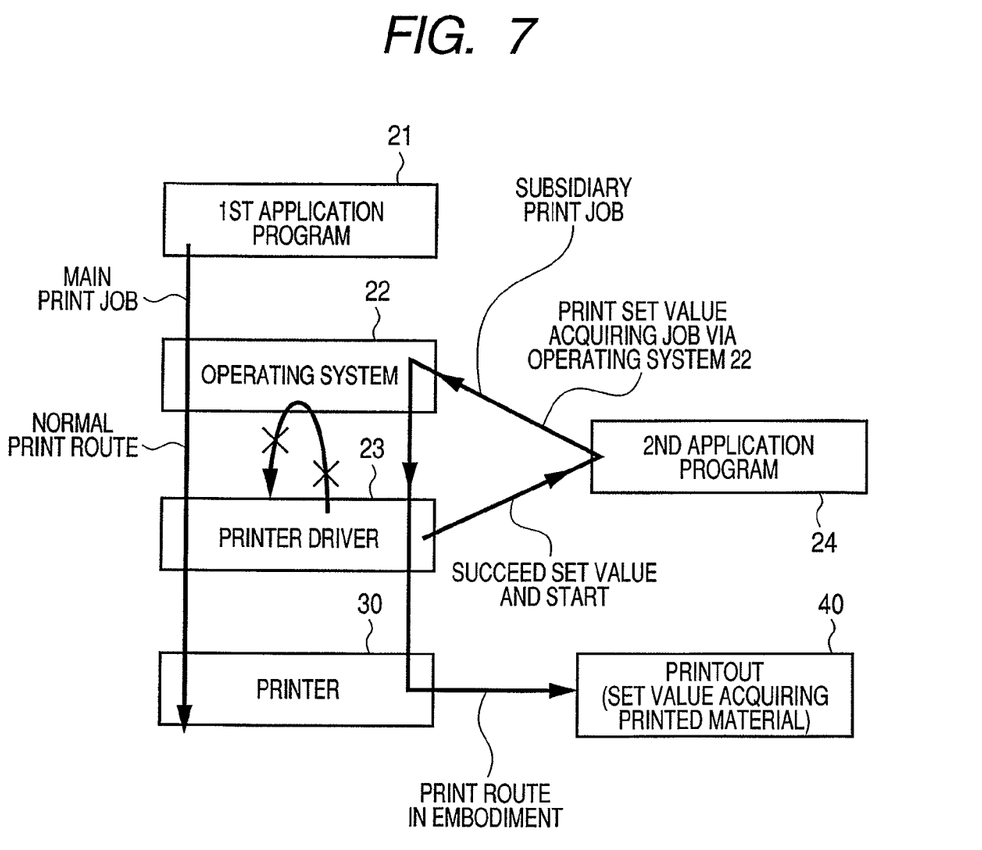
FIG. 7 is a diagram for describing the operation of the embodiment 1.

FIG. 7 is a diagram for describing the operation of the embodiment 1.

First, the printer driver 23 starts the second application program 24 (as step S1 of FIG. 6). At this time, the settings (sheet type and the like) of the printer driver 23 are succeeded to the second application program and the second application program is started. Subsequently, setting application dedicated data (environment light setting charts 70) of the printer driver 23 is printed from the second application program 24. That is, the environment light setting charts 70 are printed through a system of [the application program 24 (as step S2 of FIG. 6)→the operating system 22 (as step S3 of FIG. 6)→the printer driver 23 (as step S4 of FIG. 6)]. In FIG. 7, a system (route) of [the printer driver 23→the operating system 22→the printer driver 23] is a violation of a rule because the driver forms the job as an application (in the diagram, when an arrow showing the route is annexed with x marks, this means that such a route is a violation).

After that, the printed environment light setting charts 70 are arranged in the printed material actual viewing environment and the environment light setting chart of the desirable color is selected. When the printing is executed from the printer driver 23, the environment light setting chart number selected by using the environment light setting charts 70 is set. By the setting of the environment light setting chart number, the printout 40 in which the color matching suitable for the printed material viewing environment has been performed can be obtained.

A point that when the setting application dedicated data of the printer driver 23 is printed through the second application program 24 which has been started by the printer driver 23, the settings of the printer driver 23 are succeeded to the second application program 24 is a feature of the embodiment 1. A point that the result obtained by selecting through the environment light setting charts 70 which were output is reflected to the actual printout 40 and printed is also a feature of the embodiment 1.

In the above embodiment, a first print job as a print job other than the main print job can be also used in place of the main print job. A second print job as a print job other than the subsidiary print job (print job other than the first print job) may be used in place of the subsidiary print job.

According to the above embodiment 1, the subsidiary print job can be formed without destroying the relationship between the master and the servant in the print process, that is, such a relation that the printer driver 23 processes the job formed by the application program.

The system further has transfer means for transferring, from the printer driver 23, a part or all of the print settings of the main print job designated from the first application program 21 to the second application program 24 having the function of forming the subsidiary print job. Thus, it is unnecessary that the print settings which were once set by the printer driver 23 are set by the second application program 24 again, and usability can be improved.

Further, the subsidiary print job which is formed by the second application program 24 includes information for deciding the print settings of the main print job which is formed by the first application program 21. Thus, the information obtained by the printing of the subsidiary print job can be fed back to the print settings of the main print job. For example, if information for improving precision of the color matching can be obtained from the print result of the subsidiary print job, when the main print job is printed, a better result can be obtained.

Moreover, the second application program 24 having the function of forming the subsidiary print job has means for designating the subsidiary print job data. Thus, arbitrary data can be printed by the subsidiary print job. For example, even in a case where printer adjusting data is updated, the system can flexibly cope with such a case.

The system has print setting changing means for reflecting the print settings decided by the information included in the subsidiary print job which is formed by the second application program 24 to the main print job which is designated from the first application program 21. Thus, the information obtained by the printing of the subsidiary print job can be fed back to the print settings of the main print job from the setting means on the printer driver 23.

In addition, the print settings decided by the information included in the subsidiary print job which is formed by the second application program 24 are set into the printer 30 and reflected to the subsequent print jobs. Thus, since the information included in the subsidiary print job can be provided for the printer main body side, a computer or user other than the host computer or user which/who made the setting of the information can also receive the feedback of the print settings.

The information which is determined by the information included in the subsidiary print job which is formed by the second application program 24 is information for performing the proper color matching according to the printed material viewing environment. Thus, the user can obtain the information for performing the proper color matching according to the printed material viewing environment.

In other words, in the print system having the information processing apparatus and the printer, the above embodiment has a first application program for forming the first print job. The above embodiment has a printer driver for inputting the first print job formed by the first application program through the operating system and processing the input first print job. Further, the above embodiment has a second application program for forming a second print job different from the first print job and sending it to the operating system. Moreover, in the above embodiment, the printer driver starts the second application program and transfers the settings of the printer driver to the second application program. The above embodiment receives the second print job formed by the second application program through the operating system, processes the second print job, and allows the printer to print the second print job.

In this case, the embodiment has transfer means for transferring a part or all of the print settings of the first print job designated from the first application program to the second application program from the printer driver. The second print job is a job including information for deciding the print settings of the first print job. Further, the second application program is an application program for designating the second print job data. The embodiment also has print setting changing means for reflecting the print settings decided by the information included in the second print job to the first print job designated by the first application program. The print settings decided by the information included in the second print job which is formed by the second application program are print settings which are set into the printer and reflected to the subsequent print jobs. In addition, the information decided by the information included in the second print job which is formed by the second application program is information for performing the color matching according to the printed material viewing environment.

The embodiment can be also grasped as an invention of a method. That is, according to the embodiment, in a control method of the print system having the information processing apparatus and the printer, the method has a step wherein the first application program forms the first print job and stores it into a storing apparatus. The embodiment also has a step wherein the first print job formed by the first application program is input through the operating system and the printer driver processes the input first print job. Further, the embodiment has a step wherein the second application program forms the second print job different from the first print job and sends to the operating system. Moreover, in the above embodiment, the printer driver starts the second application program and the settings of the printer driver are transferred to the second application program. The embodiment receives the second print job formed by the second application program through the operating system, processes the second print job, and allows the printer to print the second print job.

Further, the embodiment can be grasped as a control program of the information processing apparatus. That is, in the control program of the information processing apparatus for outputting the print data to the printer, the above embodiment is a control program of the information processing apparatus, wherein the information processing apparatus is allowed to execute the steps whereby the first application program forms the first print job and stores into the storing apparatus. The embodiment is also a control program for allowing the information processing apparatus to execute the step wherein the first print job formed by the first application program is input through the operating system and the printer driver processes the input first print job. Further, the embodiment is a control program for allowing the information processing apparatus to execute the step wherein the second application program forms the second print job different from the first print job and sends it to the operating system. Moreover, in the above embodiment, a control program allows the information processing apparatus to execute the step wherein the printer driver starts the second application program and transfers the settings of the printer driver to the second application program. Then, a control program allows the printer driver the printer to execute the step wherein the second print job formed by the second application program through the operating system, processes the second print job, and allows the printer to print the second print job.

According to the invention, in the print system on the operating system, in the case of printing the subsidiary printout from the printer driver, such an effect that the subsidiary print job can be formed without destroying the relationship between the master and the servant in the print process is obtained.

The present application claims priority from Japanese Patent Application No. 2007-121310 filed on May 1, 2007, the content of which is hereby incorporated by reference into this application.

What is claimed is:

1. An information processing apparatus comprising:
   an inputting unit configured to input a first print job generated by a first application program, the first print job being for causing a printing apparatus to print an image;
   a second application program configured to generate a second print job, the second print job being for causing the printing apparatus to print a chart for adjusting settings which have been set for printing of the first print job input by the inputting unit; and
   a printer driver, which does not include the second application program, configured to convert the first print job input by the inputting unit or the second print job generated by the second application program into printing data, and to cause the printing apparatus to print an image based on the converted printing data corresponding to the first print job, and to cause the printing apparatus to print the chart based on the converted printing data corresponding to the second print job,
   wherein the printer driver starts the second application program in response to a user's instruction of printing the chart via a user interface for the printer driver, and the second application program started by the printer driver generates the second print job.

2. An information processing apparatus according to claim 1, further comprising an adjusting unit configured to adjust the print settings which have been set based on the first job input by the inputting unit, in response to a user's designation according to the chart which has been printed through the printer driver based on the second job generated by the second application program.

3. An information processing apparatus according to claim 1, wherein the printer driver transfers a part or all of the print settings set therein to the second application program and the second application program generates the second print job based on the print settings transferred from the printer driver.

4. An information processing apparatus according to claim 1, wherein the second application program causes a display apparatus to display thereon a screen used for the user to instruct printing of the chart when it is started by the printer driver.

5. An information processing apparatus according to claim 1, wherein the printer driver causes a display apparatus to display thereon a screen used for the user to instruct printing of the chart, and starts the second application program when the user instructs the printing of the chart on the screen.

6. An information processing apparatus according to claim 2, wherein the adjusting unit adjusts settings of the printing apparatus which the printer driver causes to print an image.

7. An information processing apparatus according to claim 2, wherein the adjusting unit adjusts settings of the printer driver.

8. A control method of an information processing apparatus, comprising:
   inputting a first print job generated by a first application program, the first print job for causing a printing apparatus to print an image;
   generating, by a second application program, a second print job, the second print job being for causing the printing apparatus to print a chart for adjusting print settings which have been set for printing of the inputted first print job; and
   causing, by a printer driver which does not include the second application program and is configured to convert the inputted first print job or the second print job generated by the second application program into printing data, the printing apparatus to print an image based on the converted printing data corresponding to the first print job, and to cause the printing apparatus to print the chart based on the converted printing data corresponding to the second print job,
   wherein the printer driver starts the second application program in response to a user's instruction of printing the chart via a user interface for the printer driver, and the second application program started by the printer driver generates the second print job.

9. A non-transitory computer-readable storage medium on which is stored a control program of an information processing apparatus, said control program allowing the information processing apparatus to execute:
   inputting a first print job generated by a first application program, the first print job for causing a printing apparatus to print an image;
   generating, by a second application program, a second print job, the second print job being for causing the printing apparatus to print a chart for adjusting print settings which have been set for printing of the inputted first print job; and
   causing, by a printer driver which does not include the second application program and is configured to convert the inputted first print job or the second print job generated by the second application program into printing data, the printing apparatus to print an image based on the converted printing data corresponding to the first print job, and to cause the printing apparatus to print the chart based on the converted printing data corresponding to the second print job,
   wherein the printer driver starts the second application program in response to a user's instruction of printing the chart via a user interface for the printer driver, and the second application program started by the printer driver generates the second print job.

* * * * *